UNITED STATES PATENT OFFICE.

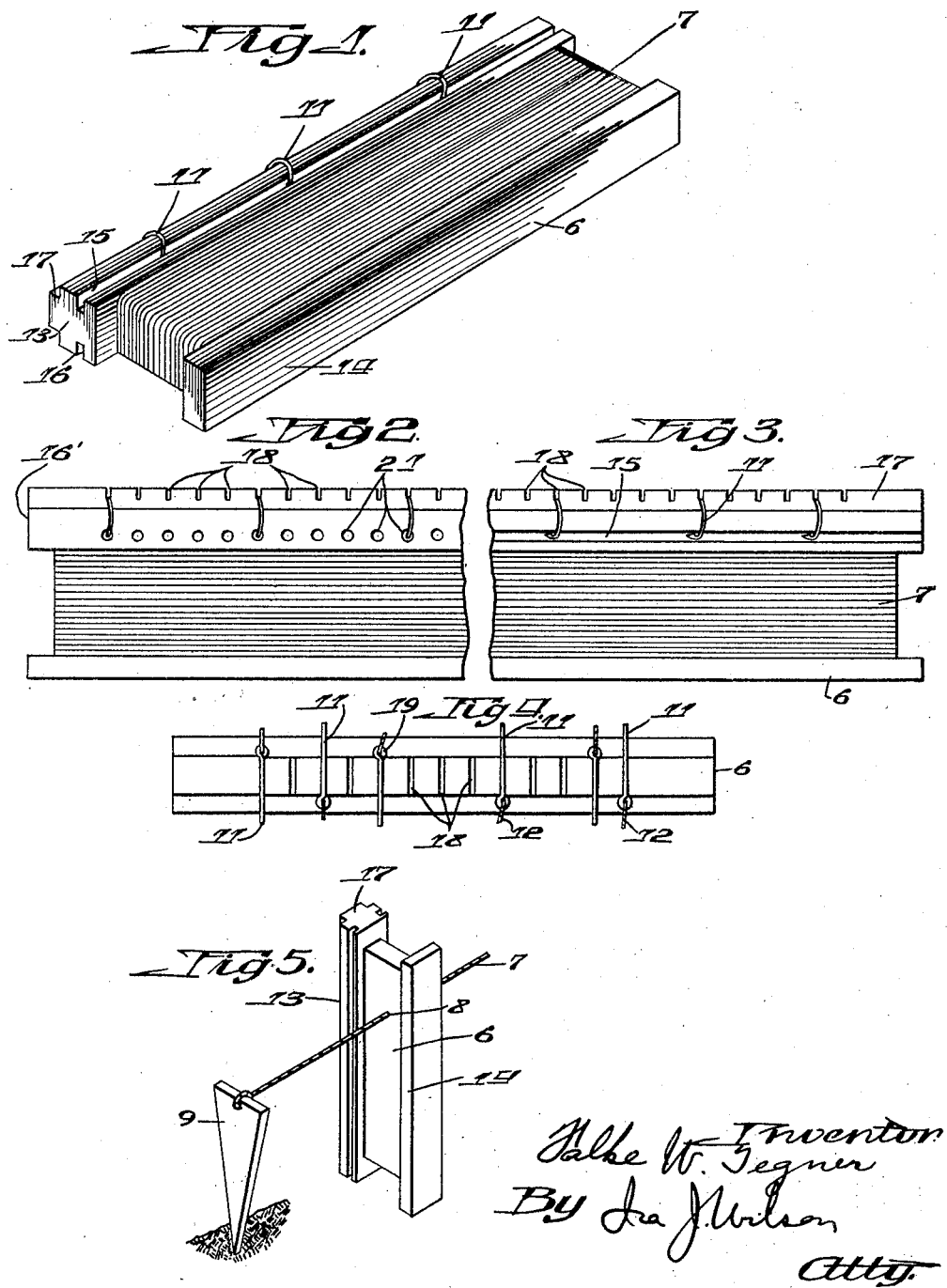

FOLKE W. TEGNER, OF ROCKFORD, ILLINOIS.

FISHING-TACKLE HOLDER.

1,397,790. Specification of Letters Patent. Patented Nov. 22, 1921.

Application filed March 14, 1921. Serial No. 452,376.

*To all whom it may concern:*

Be it known that I, FOLKE W. TEGNER, a citizen of the United States, residing at Rockford, in the county of Winnebago and State of Illinois, have invented certain new and useful Improvements in Fishing-Tackle Holders, of which the following is a specification.

This invention pertains in general to fishing, and has more particular reference to tackle holders of that class used for hand lines, more commonly known as throw lines.

One of the primary objects of the present invention is to provide a tackle holder so constructed that the fishing line may be wound thereon in the usual manner and the hooks may be conveniently secured and held in a protected position on the holder, thus permitting the latter to be freely handled without danger of injury from the hooks.

Another object is to provide a throw line and tackle holder therefor, of novel construction, including a reel, line and stake associated in a particularly advantageous manner.

Still another object is to provide as an article of manufacture, a fishing tackle holder so constructed that it will satisfactorily serve the purposes described and will be capable of economical production.

Other objects and attendant advantages will be appreciated by those familiar with this art as the invention becomes better understood by reference to the following description when considered in connection with the accompanying drawings, in which—

Figure 1 is a perspective view of a fishing tackle holder embodying one form of my invention;

Figs. 2 and 3, are fragmentary side views of two different forms of tackle holder;

Fig. 4, an edge view of the tackle holder, common to both the forms shown in Figs. 2 and 3; and Fig. 5, a perspective view of one of the tackle holders in connection with a stake and the line.

Referring now more particularly to the form of invention shown in Figs. 1, 3, 4 and 5, it will be observed that I have provided a reel designated generally by the character 6, which may be of any suitable size, shape and proportion for the winding of a fishing line 7. This line is passed through a hole 8 in the reel and connected to a suitable stake 9 adapted to be driven into the ground or any other fixed supporting body, providing an anchor for the fishing line. It will be understood that the line is equipped at spaced points with fish hooks 11, each hook being attached to the main line through the usual hook fastening line 12.

In practice, the stake is driven into a fixed support, providing the anchor for the line as already described, and the fishing tackle is used in the well known manner as a set or throw line, it being observed that the reel remains permanently associated with the line and stake. When finished fishing the line 7 will be drawn through the hole 8 until the stake 9 is disposed within the enlarged sides 13 and 14 of the reel, whereupon the line will be wound upon the reel, thereby covering the stake and insuring its permanent relation with the reel as part of the tackle. As each hook snell is reached, it will be drawn taut against the reel and the hook will be secured thereto by reason of special means afforded by the reel construction, which will now be described.

In the form of my invention referred to, the enlarged side 13 of the reel is grooved longitudinally at both side faces as at 15 and 16, and has a reduced outer edge 17 which is slotted transversely at short intervals, as indicated by 18. It will be readily observed that each hook as it is reached in winding the fishing tackle on the reel, may be inserted in the closest slot 18 and with the sharpened point of the hook disposed within one of the slots 15 or 16 depending on the side at which the hook terminated in the winding. It will be further observed that in so positioning the hook, the point will be first engaged in the longitudinal groove and the shank, then drawn down into the transverse groove 18, the reel being preferably so shaped and proportioned that the body of the eye 19 bears against the adjacent edge of the raised portion 17 and serves to lock the hook in this position. By reason of this construction, the hooks must be slightly flexed in order to arrange them in final position on the holder, but when in this final position they are under practically no strain, although securely held againt accidental displacement. It will be particularly noted that in this position the hook points are thoroughly protected and that the tackle holder may be handled with fullest immunity of danger from the sharp hook points.

In the modified form of the invention as shown in Fig. 2, individual holes 21 are provided in the side 16' for the reception of the hook points. In either case, the result is substantially the same, except that the form shown in Fig. 3, will more readily accommodate hooks of different sizes.

It is believed that the foregoing conveys a clear understanding of the objects prefaced above, and it should be understood that while I have illustrated but a single working embodiment of my invention, with the exception of the grooves 15—16 and the holes 21, it should be understood that considerable change might be made in the size, shape and proportions of the tackle holder without departing from the spirit and scope of the invention as expressed in the appended claims; in which—

I claim:

1. A fishing tackle holder comprising a reel body having recessed ends about which a line carrying hook snells and hooks is adapted to be wound, one of the side edges of said body intermediate said ends having a series of transverse slots and one side face of said body being recessed to receive the hook points, whereby as the line and snells are wound on the reel the shanks of the respective hooks may be positioned in said transverse slots with their points in said recessed body.

2. A fishing tackle holder of the character described comprising a reel having a hole therethrough, a line passing through the hole and equipped with fish hooks, a stake attached to the line, and means on the reel for holding the hooks with the points protected.

3. A fishing tackle holder comprising a reel body upon which is adapted to be wound a line equipped with snells and hooks, one of the longitudinal edges of said body between the ends upon which the line is wound having a series of transverse slots for the reception of the straight portion of the hook shanks, and said body being shaped adjacent to said slots to receive the points of the hooks disposed therein.

4. A fishing tackle holder of the character described comprising a reel body having recessed ends about which a line with snells and hooks is adapted to be wound, the reel having transverse slots along one longitudinal edge adapted for reception of the hooks transverse to the plane of the reel, said reel body being further shaped to hold the hooks with their points directed inwardly.

FOLKE W. TEGNER.